(12) United States Patent
Olsson et al.

(10) Patent No.: US 9,215,582 B2
(45) Date of Patent: Dec. 15, 2015

(54) NODE SELECTION IN A COMMUNICATION NETWORK

(75) Inventors: Lars-Bertil Olsson, Angered (SE); Goran Rune, Linkoping (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 490 days.

(21) Appl. No.: 13/505,361

(22) PCT Filed: Nov. 1, 2010

(86) PCT No.: PCT/EP2010/066554
§ 371 (c)(1),
(2), (4) Date: May 1, 2012

(87) PCT Pub. No.: WO2011/051487
PCT Pub. Date: May 5, 2011

(65) Prior Publication Data
US 2012/0213140 A1    Aug. 23, 2012

Related U.S. Application Data

(60) Provisional application No. 61/257,157, filed on Nov. 2, 2009.

(51) Int. Cl.
*H04W 8/08* (2009.01)
*H04W 36/12* (2009.01)

(52) U.S. Cl.
CPC ............... *H04W 8/08* (2013.01); *H04W 36/12* (2013.01)

(58) Field of Classification Search
CPC ................................ H04W 36/12; H04W 8/08
USPC ......... 370/390–410, 254–256, 328, 329, 331; 455/435.1
See application file for complete search history.

(56) References Cited

U.S. PATENT DOCUMENTS

| | | | |
|---|---|---|---|
| 8,428,588 B2* | 4/2013 | Gustafsson et al. | 455/435.1 |
| 8,457,635 B2* | 6/2013 | Bachmann et al. | 455/436 |
| 2008/0268842 A1 | 10/2008 | Herrero-Veron | |
| 2010/0061331 A1* | 3/2010 | Guo et al. | 370/329 |
| 2010/0323700 A1* | 12/2010 | Bachmann et al. | 455/436 |
| 2012/0202491 A1* | 8/2012 | Fox et al. | 455/435.1 |

OTHER PUBLICATIONS

3GPP TS 23.401 V9.2.0 (Sep. 2009), "3rd Generation Partnership Project; Technical Specification Group Services and System Aspects; General Packet Radio Service (GPRS) Enhancements for Evolved Universal Terrestrial Radio Access Network (E-UTRAN) access (Release 9)", Sep. 2009, pp. 1-245, XP050363633.

* cited by examiner

*Primary Examiner* — Christopher Grey
(74) *Attorney, Agent, or Firm* — Rothwell, Figg, Ernst & Manbeck, P.C.

(57) ABSTRACT

The present invention relates to a method in a user equipment (115) for enabling mobility management node (103) selection in a communication network (100, 200). The user equipment (115) comprises a globally unique identifier assigned by the mobility management node (103). The user equipment (115) obtains (701) information, using the globally unique identifier, about the mobility management node (103) with which the user equipment (115) has been registered. The user equipment (115) transmits (702), when an idle state signaling reduction function, referred to as ISR, is inactive, the information about the registered mobility management node (103) to a base station (105). The information enables the base station (105) to select the registered mobility management node (103).

11 Claims, 8 Drawing Sheets

NODE SELECTION IN A COMMUNICATION NETWORK

CROSS-REFERENCE TO RELATED APPLICATIONS

This application is a 35 U.S.C. §371 National Phase Entry Application from PCT/EP2010/066554, filed Nov. 1, 2010, and designating the United States, which claims priority to U.S. Application No. 61/257,157, filed Nov. 2, 2009. The entire contents of said applications are incorporated by reference herein.

TECHNICAL FIELD

This invention relates generally to a user equipment and a method in the user equipment. More particularly this invention relates to enabling mobility management node selection in a communication network.

BACKGROUND

In the $3^{rd}$ Generation Partnership Project (3GPP) architecture of the Radio Access Network (RAN), the Evolved Universal Terrestrial Radio Access Network (E-UTRAN) access is provided by Radio Base Stations (RBS). A Radio Base Station is called eNodeB (eNB) in E-UTRAN.

FIG. 1 illustrates the architecture of an embodiment of a communication network 100 at interaction between mobility management nodes, such as e.g. between a S4 Serving General Packet Radio Service (GPRS) Support Node (SGSN) 101 and a Mobility Management Entity (MME) 103. The communication network 100 is a telecommunication network using wireless and/or wired communication techniques. The communication network 100 may use technologies such as Long Term Evolution (LTE), General Packet Radio Service (GPRS) etc. It should be noted that the communication links in the communication network 100 may be of any suitable kind comprising either a wired or wireless radio link. The links may use any suitable protocol depending on type and level of layer, e.g. as indicated by the Open System Interconnection (OSI) model, as understood by the person skilled in the art. A base station 105, such as e.g. an eNodeB, communicates with the core network (CN) functions MME 103 using the S1-MME reference point, and with the Serving Gateway (SGW) 107 using the S1-U reference point. The SGW 107 acts as a mobility anchor and routes and forwards user plane data between a Packet Data Network Gateway (PDN gateway) 109 and the base station 105.

The MME 103 is a core network node which provides core network mobility management of the E-UTRAN 111 access, and the SGW 107 provides Internet Protocol (IP) connectivity of E-UTRAN 111 access. The S4 SGSN 101 is a core network node which provides core network mobility management of the UTRAN 112 and Global System for Mobile communication (GSM) Edge Radio Access Network (GERAN) 113 accesses.

Interaction between the S4 SGSN 101 and the MME 103 is performed at the S3 reference point. A User Equipment (UE) 115 registered by an S4 SGSN 101 may use an Idle mode Signaling Reduction (ISR). Idle mode signaling reduction is a feature that allows the user equipment 115 to roam between LTE and $2^{nd}$ Generation/$3^{rd}$ Generation (2G/3G) without performing location registration at the mobility management node in the new access. The ISR will be described in more detail below.

The user equipment 115 may be any suitable communication device or computational device with communication capabilities capable to communicate with a base station over a radio channel, for instance but not limited to mobile phone, smart phone, Personal Digital Assistant (PDA), laptop, MP3 player or portable Digital Video Disc (DVD) player, or similar media content devices, digital camera, or even stationary devices such as a Personal Computer (PC). A PC may also be connected via a user equipment 115 as the end station of the broadcasted/multicasted media. The user equipment 201 may be referred to as UE in some of the drawings.

The MME 103 is responsible for authenticating the user equipment 115 by interacting with a subscription unit, e.g. a Home Subscriber Server (HSS) 116.

The PDN Gateway 109 provides connectivity from the user equipment 115 to external packet data networks providing IP services from operators, such as e.g. IP Multimedia Subsystem (IMS), packet switch streaming (PSS) etc. 118

A Policy and Charging Rules Function (PCRF) 121 is connected between the PDN Gateway 109 and an operator's IP services 118, and takes care of policy and charging issues between the user equipment 115 and the operator.

The SGSN 101 connects to the UTRAN 112/GERAN 113.

It should be appreciated that the network 100 is configured with cabling, routers, switches, and other network building elements (not shown) as understood by the skilled person, for instance as used for building an Ethernet or Wireless Access Network (WAN) network.

As illustrated in FIG. 2, the interaction between Gn/Gp SGSN 101 and MME 103 is performed at the Gn reference point. A user equipment 115 registered by a Gn/Gp SGSN 101 does not have ISR active. The Gn/Gp SGSN 101 is a core network node which provides core network mobility management of the UTRAN 112 and GERAN 113 accesses. An SGSN 101 complying with a 3GPP release prior of Rel-8 is a Gn/Gp SGSN. A Rel-8 and later releases of an SGSN may be either a Gn/Gp SGSN or an S4 SGSN. The units shown in FIG. 2 are basically the same as in FIG. 1. Therefore, the descriptions of the units are not repeated for the sake of simplicity.

Security Handling at an Access Change to E-UTRAN

The 3GPP access may be protected by security mechanisms that employ integrity and ciphering on the radio interface. In GERAN, ciphering is, optionally, applied to protect the user data. In UTRAN, ciphering is, optionally, applied to protect the user data. Control signaling is integrity protected, mandatory, and encrypted, optional. For UTRAN the control signaling is protected by a Radio Network Controller (RNC). This applies both to Access Stratum (AS) signaling, Radio Resource Control (RRC) signaling between the RNC and the user equipment 115 and Non Access Stratum (NAS) signaling, CN—UE signaling. For the E-UTRAN 111 access, the security requirement is extended to for normal use, i.e. non-emergency use, require use of integrity protection, and optionally ciphering of the NAS signaling independent of the AS signaling. I.e. the AS signaling is protected by the E-UTRAN 111, in the eNodeB 105, and the NAS signaling is protected by the Evolved Packet Core (EPC), in the MME 103.

For the E-UTRAN 111 access the security mechanisms has also been changed and they are not backwards compatible. This means that it is not possible to derive a full, i.e. native Evolved Packet System (EPS) security context based on a Universal Subscriber Identity Module (USIM) security context used in GERAN 113 or UTRAN 112.

It is permitted to temporarily, during an access change to E-UTRAN 111 and for NAS messages sent by the user equipment 115 to the MME 103, use a mapped security context based on the GERAN 113/UTRAN 112 security context. However, 3GPP recommends that the mapped security context is replaced with a native EPS security context as soon as possible after access change to E-UTRAN 111.

The user equipment 115 may simultaneously store both a mapped security context and the native EPS security context that was used last time the user equipment 115 visited the E-UTRAN access 111.

If a native security context is available then the MME 103 may start to use it by executing a Secure Mode Command (SMC) procedure, i.e. NAS signaling.

If there is no native security context available then the MME 103 must first execute the authentication procedure which may comprise retrieving new EPS security vectors from the HSS 116/Authentication Centre (AuC).

E-UTRAN Interaction with Legacy GERAN/UTRAN Access and Gn/Gp SGSN

The user equipment 115 may have two temporary identities pointing out which packet core node, i.e. SGSN 101/MME 103, which shall handle traffic for the user equipment 115. When ISR is active, the user equipment 115 uses two independent identifiers, Globally Unique Temporary Identity (GUTI) to the MME 103 and Packet Temporary Mobile Subscriber Identity (P-TMSI) to the SGSN 101, to enable radio nodes to select the correct packet core node in a pool configuration.

When ISR is not active the user equipment 115 uses only one temporary identifier for the node registration: either a P-TMSI plus an old Routing Area Identity (RAI) provided by an SGSN 101, or a GUTI provided by an MME 103 to enable radio nodes to select the correct node in a pool configuration. If the user equipment 115 only has the P-TMSI, but needs the GUTI, then the user equipment 115 maps the value of the P-TMSI into the GUTI parameter, providing a mapped GUTI. Then, the task of the eNodeB 105 is to interpret a Globally Unique MME Identifier (GUMMEI) part of the mapped GUTI assigned by the SGSN 101, and to perform a correct choice of MME 103.

The existing method for enabling mobility management node selection, i.e. the existing user equipment behavior will now be described with reference to the combined signaling diagram and flowchart depicted in FIG. 3 and the block diagram depicted in FIG. 4.

Step 301
The user equipment 115 selects to perform an access change, e.g. from GERAN/UTRAN to E-UTRAN 111.

Step 302
The user equipment 115 has previously been assigned the P-TMSI and the old RAI by the SGSN 101. The P-TMSI and the old RAI are identification parameters of the SGSN 101.

Step 303
The MME 103 provides the eNodeB 105 with configuration data matching all valid data. The configuration data specifies for which values of a mapped GUTI the eNodeB 105 shall select the correct MME at which the user equipment 115 is registered and where a native EPS security context is stored.

The configuration data comprises all Location Area Code (LAC) values matching a location in the legacy 3GPP access from where the user equipment 115 may perform an access change to a coverage area of E-UTRAN 111 which is supported by the MME 103 where the user equipment 115 is registered.

Step 304
At an access change to e.g. E-UTRAN 111, the user equipment 115 maps the temporary user equipment identifier, i.e. the P-TMSI plus the old RAI, used in the current access to the identifier, e.g. the GUTI, used in the target access as specified by 3GPP.

The mapping from P-TMSI plus old RAI into GUTI is made such that the LAC is copied into the MME Group ID of the mapped GUTI, and to enable the eNodeB 105 to identify the LAC value as an associated value and thereby select a specific MME 103. It therefore requires the MME 103 to provide configuration data that comprises all LAC values matching a location in the legacy 3GPP access from where the user equipment 115 may perform an access change to a coverage area of E-UTRAN 111 which is supported by the MME 103 where the user equipment 115 is registered, as mentioned above.

Both P-TIMSI and GUTI are identifiers known in the core network, but typically unknown to the radio access network. For that reason the mapping of temporary user equipment identifiers must be performed on the NAS layer.

Step 305
The user equipment 115 provides the mapped parameter, i.e. the mapped GUTI, to its lower layers, e.g. the RRC. In some embodiments, the user equipment supplies a GUMMEI part of a mapped GUTI to lower layers. The lower layers, e.g. RRC, are a transport layer responsible for transporting data from the user equipment 115 to the eNodeB 105.

The mapped GUTI is transmitted in a NAS-message to a lower layer entity, e.g. the RRC, of the user equipment 115 which provides the identity of the registered MME 103, i.e. the MME 103 to which the user equipment 115 is registered.

The lower layer of the user equipment 115 uses the information at establishing a signaling connection and provides the mapped GUTI to the eNodeB 105.

For example, in the case a user equipment 115 moves from GERAN/UTRAN to E-UTRAN the old user equipment reference is the Packet Temporary Mobile Subscriber Identity (P-TMSI), mapped into the GUTI. Both P-TIMSI and GUTI are identifiers known in the core network, but typically unknown to the Radio Access Network (RAN). For that reason the mapping of temporary user equipment identifiers must be performed on the Non-Access Stratum (NAS) layer.

However, since it is a mapped GUTI it is a reference allocated by the SGSN 101 and cannot be used by the MME 103 to perform internal routing to find the user equipment context.

The 3GPP standard specifies that if the user equipment 115 holds a mapped GUTI then this is provided to the lower layers.

Step 306
The eNodeB 105 receives the mapped GUTI and uses it to identify at which MME 103 the user equipment 115 is registered or if the user equipment 115 is not registered by any serving MME 103. In other words, the eNodeB 105 uses the mapped GUTI to find which of the MME's in a MME pool that shall receive traffic from the user equipment 115. In some embodiments the eNodeB 105 may use the configuration data in step 305 to find a matching MME 103 to select.

However, for the eNodeB 105 to find the MME 103 based on a mapped GUTI, which is a P-TMSI plus old RAI, requires the eNodeB 105 to interpret this SGSN 101 related information as related to a specific MME 103 and as a result select this MME 103 as target for the connection attempt.

Step 307
The receiving node, i.e. the eNodeB 105 uses the mapped temporary user equipment identifier to request to get the user equipment context from the MME 103. The user equipment context comprises information about bearer resources, current security context etc. The information is required to maintain IP services at the access change.

The user equipment 115 may have two identities pointing out which packet core node, i.e. MME 103/SGSN 101, which shall handle the traffic for the user equipment 115.

If the legacy 3GPP access is handled by an SGSN pool then the pool may support a large number of LAC values.

However, since a mapped GUTI, which is a reference allocated by the SGSN 101, is used it cannot be used by the MME 103 to perform internal routing to find the user equipment context. The MME 103 will instead use the mapped GUTI to identify in which SGSN 101 the user equipment 115 is registered and from that SGSN 101 retrieve the UE context.

The problem with a large number of LAC values is that the value range of LAC may be 15 available bits, or above 32000 values. The MME 103 may therefore, in the worst case, have to provide a full range of LAC values to the eNodeB 105 in order to make it select the MME 103 where the user equipment 115 is registered, but it is not possible or practical to use such a potentially large amount of data to correlate user equipment 115 handling.

The vast amount of configuration data in MME 103 will cause network OPerating Expenditures (OPEX) to increase not only when a new MME 103 is introduced to the network, but also by succeeding configuration changes that are needed to support changes in use of LAC values from where the user equipment 115 may perform an access change to E-UTRAN. In addition, the vast amount of configuration is likely error prone from human factor at configuration input and is likely to add networking load.

The vast amount of configuration data from each MME 103 handled by the eNodeB 105 would require equally large amount of both memory and processing resources in the eNodeB 105.

The user equipment 115 will then cause the eNodeB 105 to perform unnecessary and in some cases incorrect MME 103 selections and by that cause additional load to the network 100.

Selecting a different MME will cause additional signaling to register the user equipment 115 with a new MME at the HSS 116, the UE context in the old MME is dropped when the user equipment 115 becomes registered by the new MME and by that the current native EPS security context is lost in the network. To establish a new current native security context require execution of the authentication procedure which involves MME-originating signaling towards both the HSS 116 and the user equipment 115, i.e. additional signaling over the air.

SUMMARY

It is thus an object of the present solution to provide improved signaling procedures in a communication network.

According to a first aspect of the present solution, the objective is achieved by a method in a user equipment for enabling mobility management node selection in a communication network. The user equipment comprises a globally unique identifier assigned by the mobility management node. The user equipment obtains information, using the globally unique identifier, about the mobility management node with which the user equipment has been registered. The user equipment transmits, when an idle state signaling reduction function, referred to as ISR, is inactive, the information about the registered mobility management node to a base station. The information enables the base station to select the registered mobility management node.

According to a second aspect of the present solution the objective is achieved by a user equipment for enabling mobility management node selection in a communication network. The user equipment comprises a globally unique identifier assigned by the mobility management node. The user equipment further comprises an obtaining unit configured to obtain information, using the globally unique identifier, about the mobility management node with which the user equipment has been registered. The user equipment comprises a transmitting unit which is configured to transmit, when an idle state signaling reduction function, referred to as ISR, is inactive, the information about the registered mobility management node to a base station. The information enables the base station to select the registered mobility management node.

The present solution affords many advantages, for which a non-exhaustive list of examples follows:

With the present solution there is no need for the MME to provide the eNodeB with extensive Inter radio access technology (IRAT) related configuration. The eNodeB will only have to rely on EPC related configuration information, i.e. the LAC configuration of an SGSN/SGSN pool is not needed. This minimizes the signaling in the network, and reduces the work load of the eNodeB.

Another benefit is that when there is no LAC configuration in the E-UTRAN radio nodes to select a specific MME there is also no need to keep such configuration synchronized with the actual LAC configuration in the access served by SGSN nodes.

The present solution may resolve a signaling/standardization issue as well as radically simplifying configuration needed to support interaction between GERAN/UTRAN and E-UTRAN.

Another advantage of the present solution is that the eNodeB has an increased possibility to choose the correct MME.

The present solution is not limited to the features and advantages mentioned above. A person skilled in the art will recognize additional features and advantages upon reading the following detailed description.

BRIEF DESCRIPTION OF THE DRAWINGS

The solution will now be further described in more detail in the following detailed description by reference to the appended drawings illustrating embodiments of the solution and in which.

DETAILED DESCRIPTION

Figure 1:
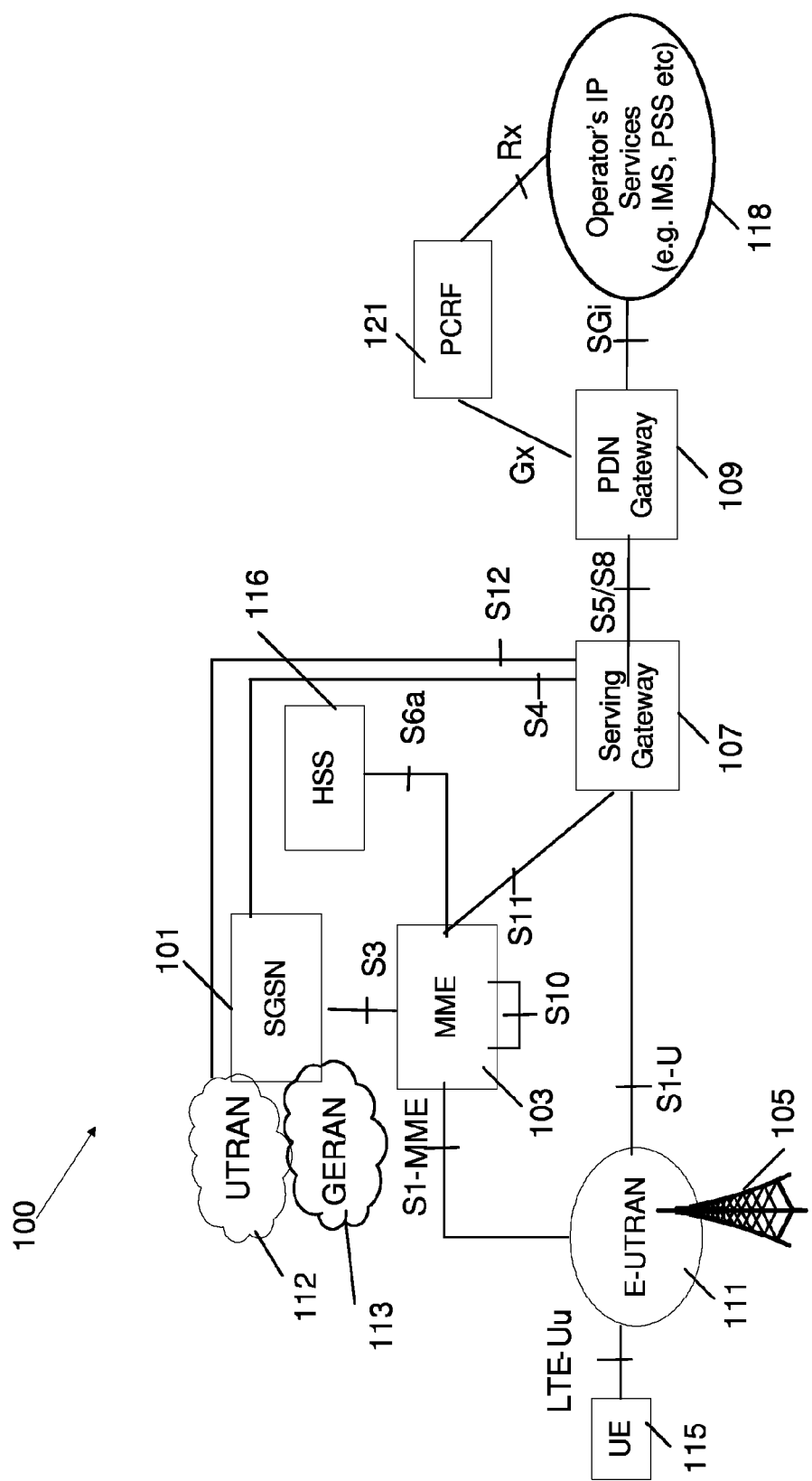
FIG. 1 is a block diagram illustrating embodiments of the architecture of an Evolved Packet System.
Figure 2:
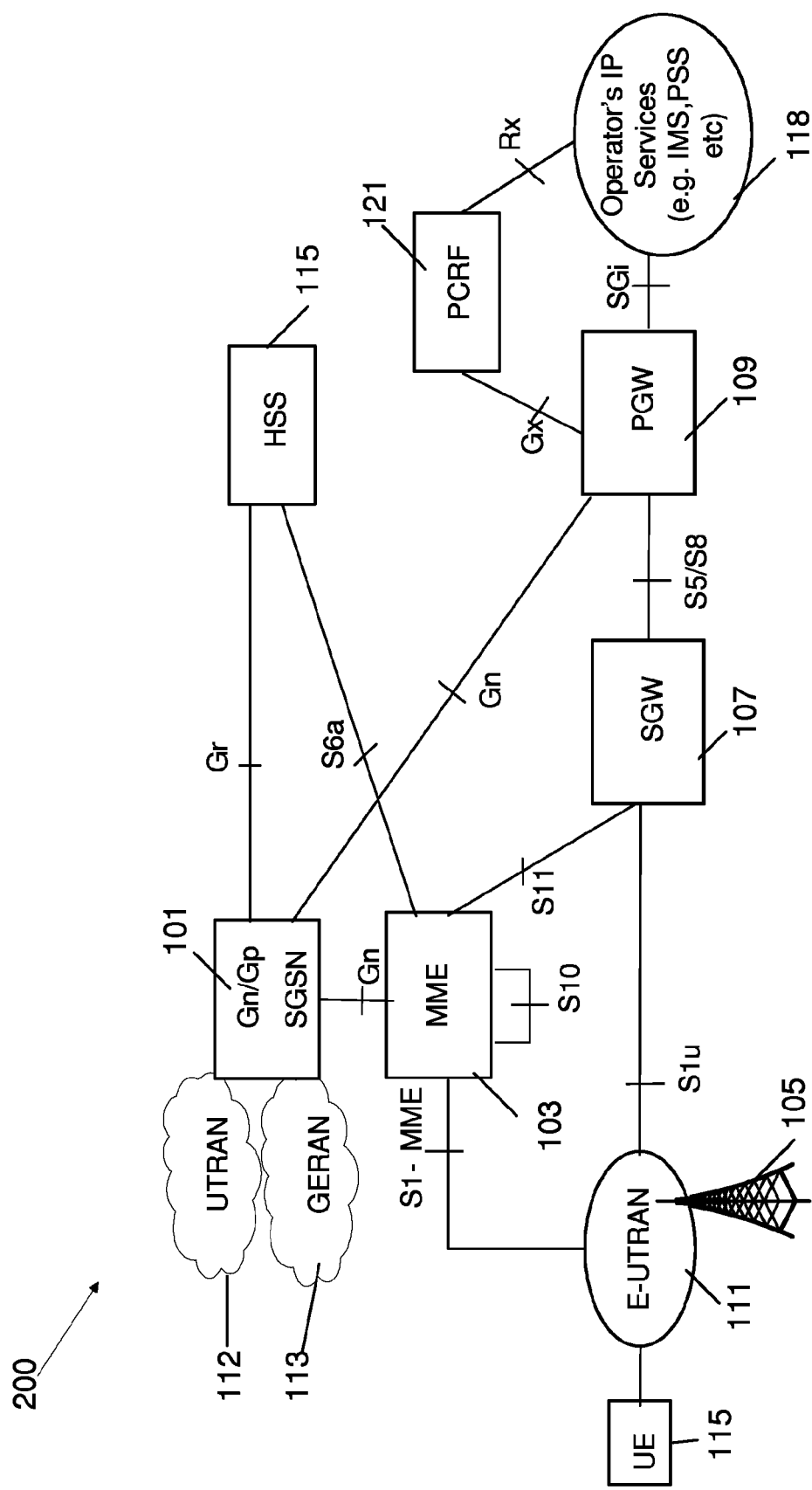
FIG. 2 is a block diagram illustrating embodiments of the architecture of an Evolved Packet System.
Figure 3:
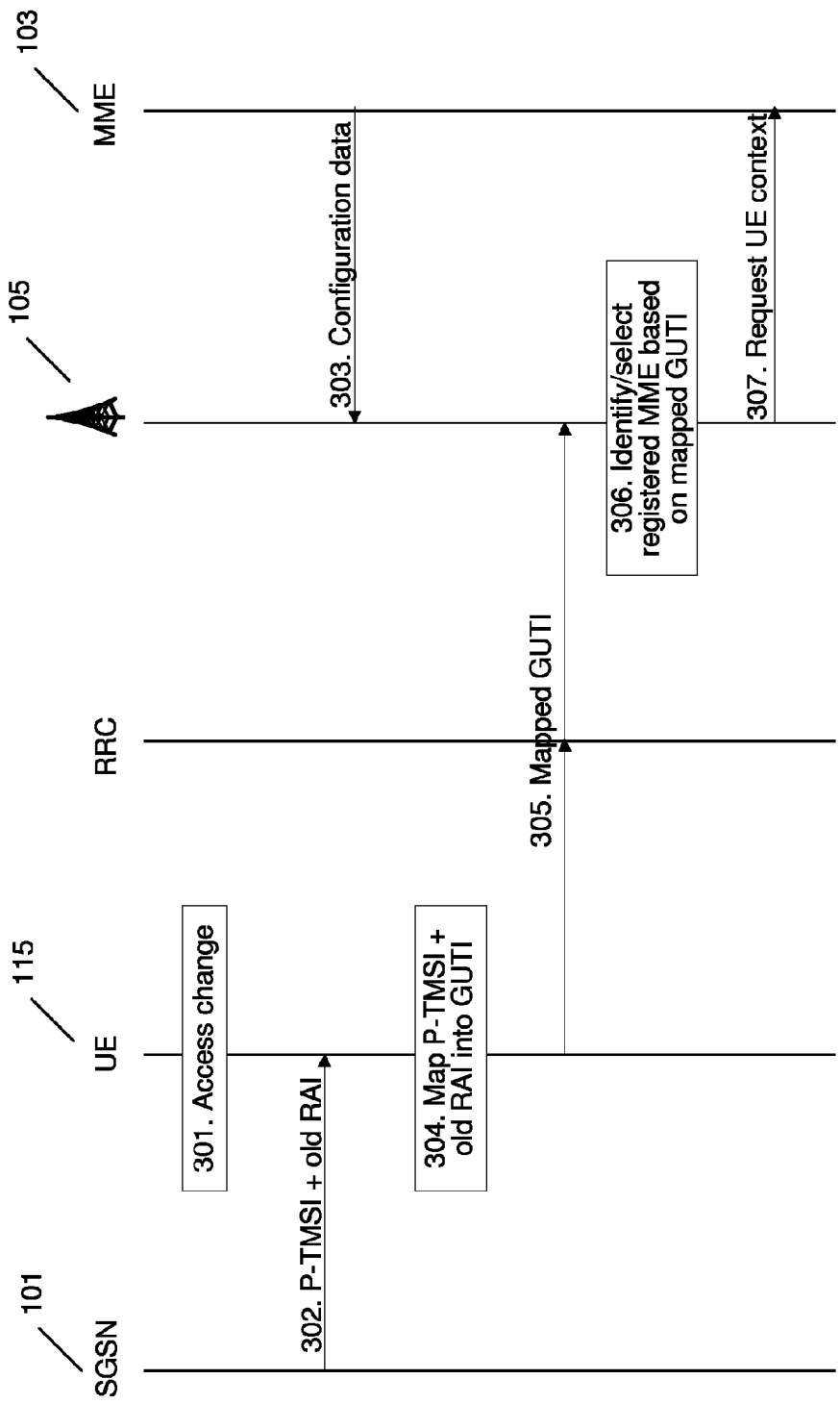
FIG. 3 is a combined signaling diagram and flowchart illustrating embodiments of a prior art method for user equipment behavior.
Figure 4:
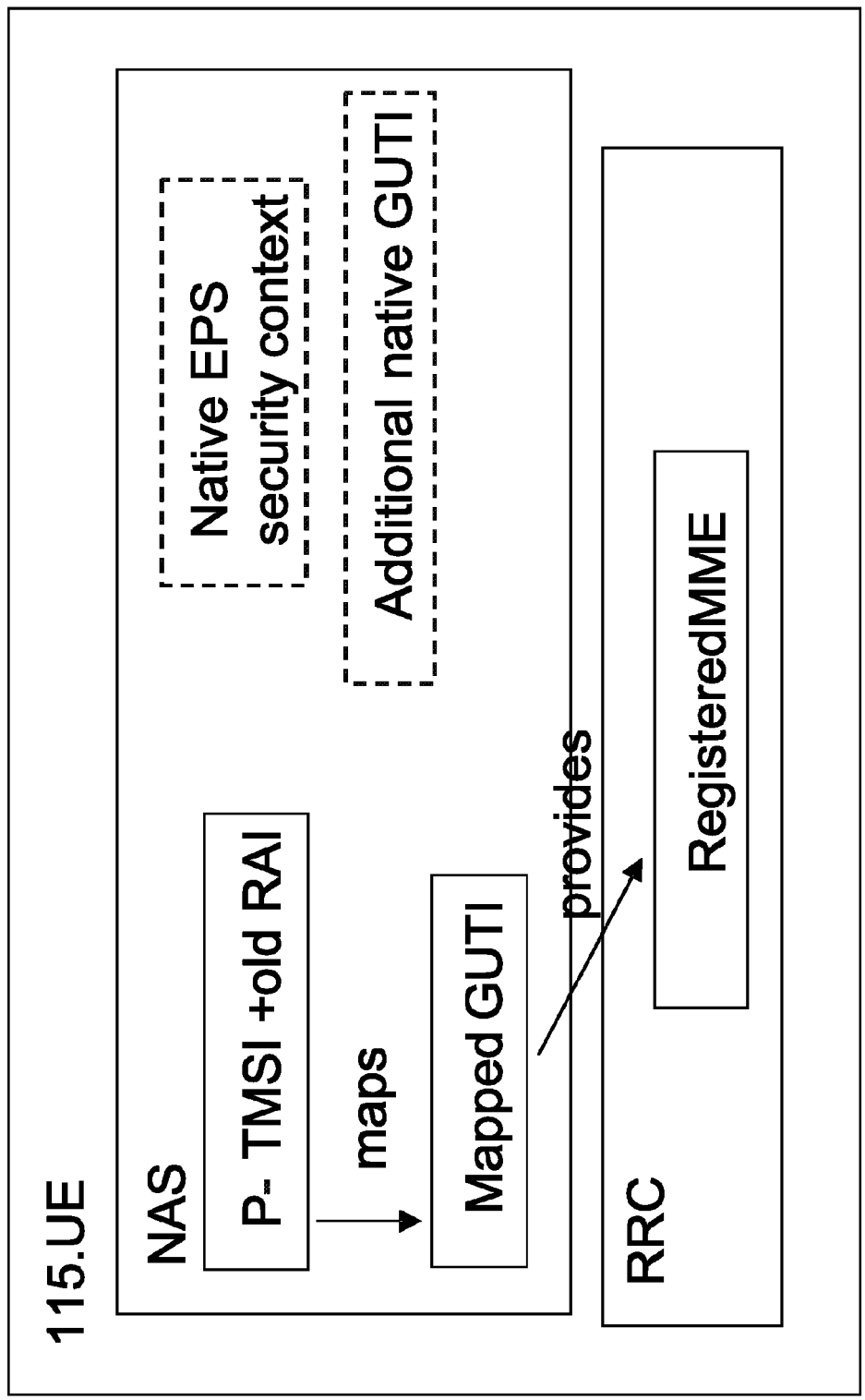
FIG. 4 is a block diagram illustrating embodiments of a prior art method for user equipment behavior.

The present solution is related to that as long as the user equipment 115 has a native GUTI assigned by the MME available, this shall be used to select the old MME when the user equipment makes an access change, e.g. a change to E-UTRAN after having been connected to GERAN or UTRAN. A prerequisite is that the ISR is inactive.

The present solution method for enabling mobility management node selection, according to some embodiments will now be described with reference to the combined signaling diagram and flowchart depicted in FIG. 5 and the block diagram depicted in FIG. 6. The method comprises the following steps, which steps may as well be carried out in another suitable order than described below:

Step 501

The user equipment 115 enters access of E-UTRAN for the first time and the eNodeB 105 selects an MME 103 where the user equipment 115 becomes registered.

Step 502

The user equipment receives a native GUTI from the MME 103, i.e. the MME 103 assigns the native GUTI to the user equipment 115. As part of the registration to E-UTRAN the user equipment 115 is also provided with a native EPS security context, which enables secure signaling to and from the user equipment 115. As mentioned earlier, a native EPS security context is a full EPS security context.

The user equipment 115 maintains the parameter additional native GUTI as long as it is allowed to maintain the temporary user equipment identifier.

Step 503

The user equipment 115 changes access to GERAN or UTRAN and becomes registered by an SGSN.

Step 504

The user equipment 115 receives a combination of P-TMSI and RAI from the SGSN 101 which together forms a unique temporary user equipment identifier for the SGSN 101 registration. The user equipment 115 maintains the native GUTI previously received from the MME 103 together with the native EPS security context, i.e. in step 502. This allows the user equipment 115 to continue to use native EPS security context at an access change back to E-UTRAN and MME 103.

Step 505

The user equipment 115 wants to do an access change, e.g. from GERAN or UTRAN to E-UTRAN 111.

Step 506

The user equipment 115 obtains a GUMMEI from the native GUTI.

The GUTI is a globally unique identifier of a user equipment 115 and comprises a GUMMEI and a MME Temporary Mobile Subscriber Identity (M-TMSI). The GUMMEI comprises Public Land Mobile Network ID (PLMN ID), MME Group ID and MME Code, i.e. the GUMMEI comprises the most significant part of the GUTI.

To enable the MME 103 to start reuse a stored native EPS security context the user equipment 115 obtains an additional temporary user equipment identifier, which the MME 103 will use to perform node internal routing to find the user equipment context and the stored native EPS security context.

Step 507

The user equipment 115 requests access to E-UTRAN and transmits the request comprising the GUMMEI obtained from the native GUTI, via lower layers, to the eNodeB 105. The request comprises a NAS message which in turn comprises a native GUTI provided as an additional NAS parameter, which allows the receiving MME 103 to internally route to the stored user equipment context and there find the native EPS security context.

The user equipment 115 provides the additional native GUTI as a parameter in the NAS message Tracking Area Update (TAU) Request when it is available and when the user equipment 115 provides a mapped GUTI in the TAU Request parameter "old GUTI".

Step 508

The eNodeB 105 selects an MME 103 based on the access request, which provides the GUMMEI extracted from the native GUTI, i.e. the eNodeB selects which MME 103 that shall receive traffic from the user equipment 115.

If the user equipment 115 is already registered by an MME 103 in the MME pool then the eNodeB 105 should select that MME 103. This corresponds to when the user equipment 115 provides the additional native GUTI in the NAS message.

An eNodeB 105 may connect to several MMEs 103. This implies that an eNodeB 105 must be able to determine which of the MMEs 103, covering the area where a user equipment 115 is located, should receive the signaling sent from a user equipment 115. To avoid unnecessary signaling in the core network, a user equipment 115 that has attached to one MME 103 should generally continue to be served by this MME 103 as long as the user equipment 115 is in the radio coverage of the MME pool area to which the MME 103 is associated. For that reason the user equipment 115 should, if available, always provide the additional native GUTI to the lower layers. In that case the eNodeB 105 is able to route to the correct MME 103 without receiving any assisting configuration data from the MME 103 relating to the LAC configuration of an SGSN 101.

If the user equipment 115 does not have a native EPS security context stored or an additional native GUTI, then the eNodeB 105 may perform the NAS Node Selection Function (NNSF)/MME Selection Function to select an arbitrary MME 103 in the MME Pool since the user equipment 115 in this case do not hold a native EPS security context and the selected MME 103 anyway have to perform authentication to change security context.

If the user equipment 115 stores a native EPS security context and an additional native GUTI that is associated with an MME 103 outside the MME pool then this is detected by the eNodeB 105 since the GUTI is a globally unique identifier. Also in this case the eNodeB 105 executes the NNSF/MME Selection Function and selects an arbitrary MME 103 in the MME pool.

Step 509

The eNodeB 103 uses the native GUTI to select the MME 103.

Figure 7:
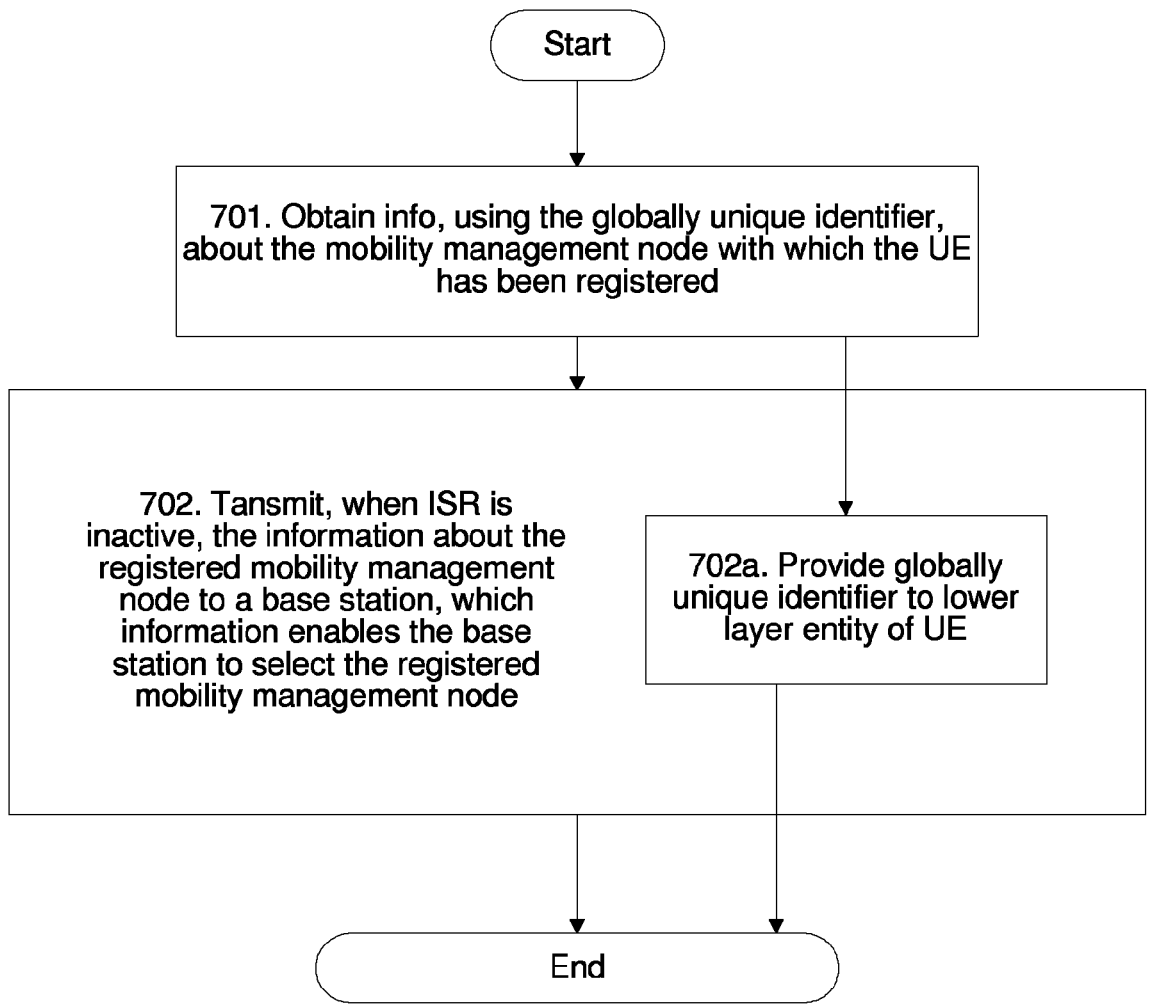
FIG. 7 is a flow chart illustrating embodiments of a method in a user equipment.

FIG. 7 is a flowchart describing the present method in the user equipment 115, for enabling mobility management node 103 selection in a communication network 100,200. The user equipment 115 comprises a globally unique identifier assigned by the mobility management node 103. In some embodiments, the globally unique identifier is an additional native globally unique temporary ID, referred to as GUTI, of the user equipment 115. In some embodiments, the globally unique identifier is comprised in the user equipment 115 for a specified period of time. The mobility management node 103 may be a mobile management entity, referred to as MME. The method comprises the steps to be performed in the user equipment 115:

Step 701

Figure 5:
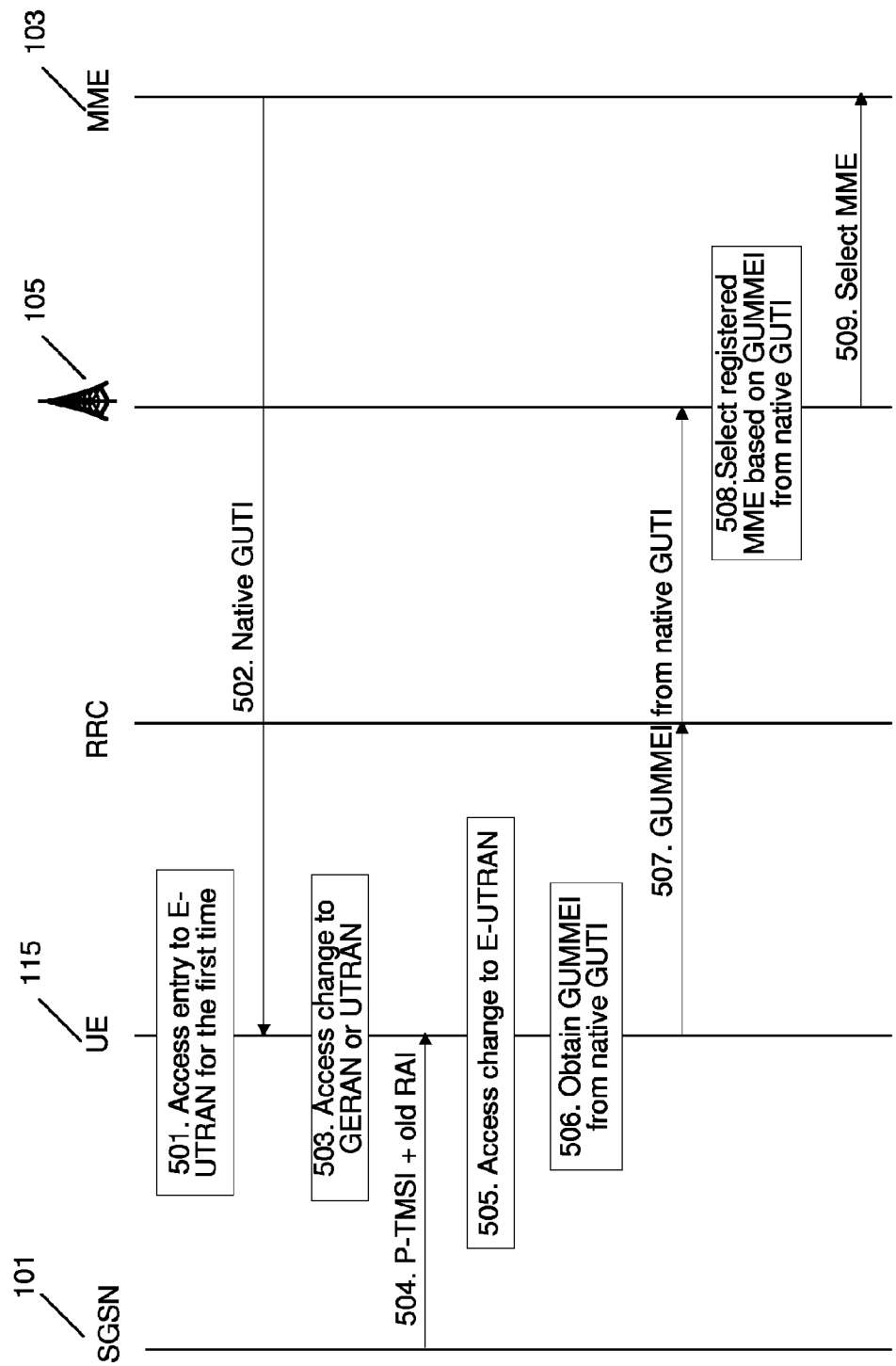
FIG. 5 is a combined signaling diagram and flowchart illustrating embodiments of a user equipment behavior.

This step corresponds to step 507 in FIG. 5. The user equipment 115 obtains information, using the globally unique identifier, about the mobility management node 103 with which the user equipment 115 has been registered.

In some embodiments, the information is a globally unique mobility management entity identifier, referred to as GUMMEI.

Step 702

This step corresponds to step 507 in FIG. 5. The user equipment 115 transmits, when an idle state signaling reduction function, referred to as ISR, is inactive, the information about the registered mobility management node 103 to a base station 105. The information enables the base station 105 to select the registered mobility management node 103.

In some embodiments, the information about the registered mobility management node 103 where the user equipment 115 has been registered is comprised in a Non-Access Stratum, referred to as NAS, message.

Step 702a

This step corresponds to step 507 in FIG. 5. This is a sub step of step 702.

In some embodiments, the user equipment 115 provides the globally unique identifier to a lower layer entity of the user equipment 115. The lower layer entity may be a radio resource controller, referred to as RRC.

Figure 6:
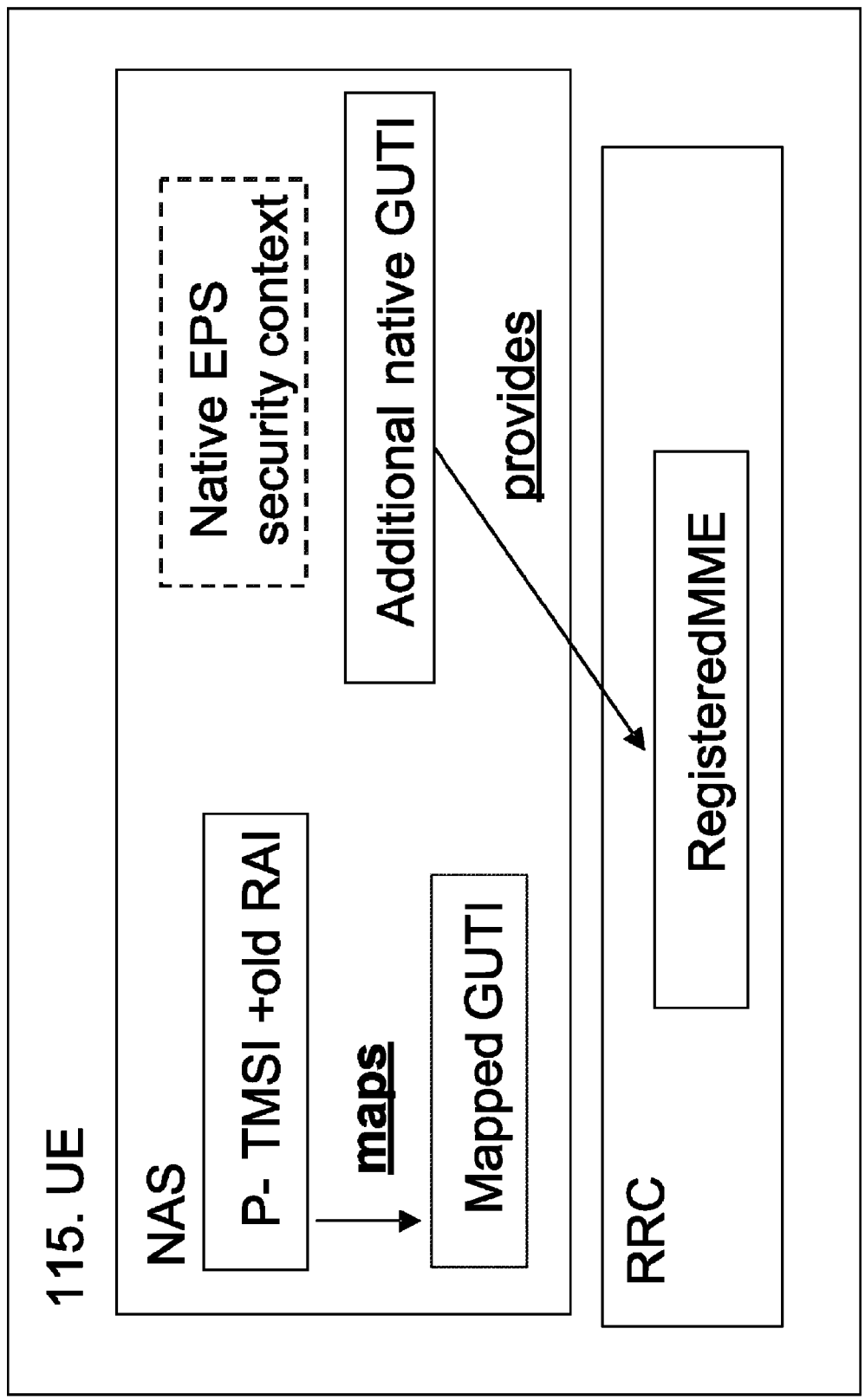
FIG. 6 is a block diagram illustrating embodiments of a user equipment behavior.
Figure 8:
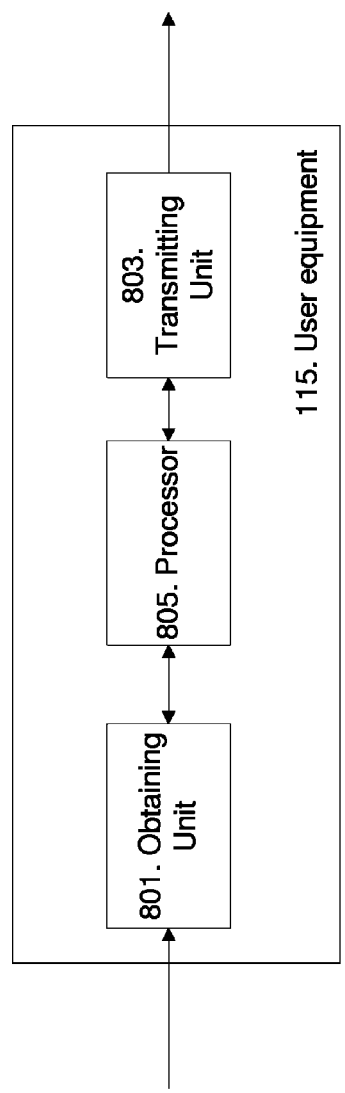
FIG. 8 is a block diagram illustrating embodiments of a user equipment.

To perform the method steps shown in FIG. 6 for enabling mobility management node 103 selection in a communication network 100,200 the user equipment 115 comprises a user equipment arrangement as shown in FIG. 8. The user equipment 115 comprises a globally unique identifier assigned by the mobility management node 103. In some embodiments, the mobility management node 103 is a mobile management entity, referred to as MME. In some embodiments, the globally unique identifier is an additional native globally unique temporary ID, referred to as GUTI, of the user equipment 115. The globally unique identifier may be comprised in the user equipment 115 for a specified period of time. The user equipment 115 further comprises an obtaining unit 801 configured to obtain information, using the globally unique identifier, about the mobility management node 103 with which the user equipment 115 has been registered. In some embodiments, the information is a globally unique mobility management entity identifier, referred to as GUMMEI. The user equipment 115 further comprises a transmitting unit 803 configured to transmit, when an idle state signaling reduction function, referred to as ISR, is inactive, the information about the registered mobility management node 103 to a base station 105. The information enables the base station 105 to select the registered mobility management node 103. The transmitting unit 803 may further be configured to provide the globally unique identifier to a lower layer entity of the user equipment 115. In some embodiments, the lower layer entity is a radio resource controller, referred to as RRC. The information about the registered mobility management node 103 where the user equipment 115 has been registered may be comprised in a Non-Access Stratum, referred to as NAS, message.

The present mechanism for selecting a node in a wireless communication network may be implemented through one or more processors, such as a processor 805 in user equipment 115 depicted in FIG. 8, together with computer program code stored on a computer readable medium for performing the functions of the present solution. The program code mentioned above may also be provided as a computer program product, for instance in the form of a data carrier carrying computer program code for performing the present solution when being loaded into the user equipment 115. One such carrier may be in the form of a CD ROM disc. It is however feasible with other data carriers such as a memory stick. The computer program code may furthermore be provided as pure program code on a server and downloaded to the user equipment 115 remotely.

It should be noted that the word "comprising" does not exclude the presence of other elements or steps than those listed and the words "a" or "an" preceding an element do not exclude the presence of a plurality of such elements. The solution may at least in part be implemented in either software or hardware. It should further be noted that any reference signs do not limit the scope of the claims, and that several "means", "devices", and "units" may be represented by the same item of hardware.

The above mentioned and described embodiments are only given as examples and should not be limiting to the present solution. Other solutions, uses, objectives, and functions within the scope of the solution as claimed in the below described patent claims should be apparent for the person skilled in the art.

It should also be emphasized that the steps of the methods defined in the appended claims may, without departing from the present solution, be performed in another order than the order in which they appear in the claims.

The invention claimed is:

1. A method in a user equipment for enabling mobility management entity (MME) selection in a communication network, the method comprising:
    the user equipment obtaining a globally unique mobile management entity identifier (GUMMEI) from a globally unique temporary identifier (GUTI) assigned by a Mobility Management Entity (MME) with which the user equipment has previously been registered, wherein the GUMMEI provides information about the MME;
    the user equipment transmitting, via a radio resource controller, RRC, to a base station using RRC signaling, when an idle state signaling reduction function, referred to as ISR, is inactive, a request to move from a universal terrestrial radio access network (UTRAN) or a global system for mobile communication edge radio access network (GERAN) to re-access an evolved universal terrestrial radio access network, E-UTRAN, wherein the request comprises the GUMMEI providing information about the MME, which GUMMEI obtained from the GUTI assigned by the MME enables the base station to re-select the previously registered MME when the user equipment is currently registered by the SGSN; and
    the user equipment receiving said native GUTI from said MME prior to the user equipment obtaining the GUMMEI from said native GUTI.

2. The method according to claim 1, wherein the request further comprises a non-access stratum, referred to as NAS, message, wherein the NAS message comprises the GUTI.

3. The method according to claim 1, wherein the GUTI is comprised in the user equipment for a specified period of time.

4. The method according to claim 1, wherein the MME is comprised in an MME pool.

5. The method according to claim 4, wherein the user equipment is within radio coverage of the MME pool.

6. The method according to claim 1, further comprising:
    obtaining a native evolved packet system, EPS, security context, which EPS security context enables secure signaling to and from the user equipment.

7. The method according to claim 1, further comprising:
    receiving the GUTI from the MME when the user equipment is in E-UTRAN for a first time, and wherein the re-access to E-UTRAN is at least a second time for the user equipment to be in E-UTRAN.

8. A method for mobility management entity (MME) selection, comprising:
- a base station receiving from a user equipment a request to move from a universal terrestrial radio access network (UTRAN) or a global system for mobile communication edge radio access network (GERAN) to re-access an evolved universal terrestrial radio access network (E-UTRAN), wherein the request comprises a GUMMEI providing information about a previously registered MME and the GUMMEI was derived by the user equipment from a native globally unique temporary identity (GUTI) assigned by an MME;
- the base station selecting an MME based on the GUMMEI derived from the native GUTI;
- the base station transmitting a message to the selected MME; and
- prior to the base station receiving the request from the user equipment, said MME registering the user equipment and transmitting said native GUTI to the user equipment.

9. The method according to claim 8, wherein the request further comprises a non-access stratum (NAS) message comprising the native GUTI.

10. The method according to claim 8, wherein the base station receives the request when an idle state signaling reduction function (ISR) is inactive.

11. The method according to claim 8, wherein the GUMMEI was derived by the user equipment from said native GUTI that was transmitted to the user equipment from said MME.

* * * * *

UNITED STATES PATENT AND TRADEMARK OFFICE
CERTIFICATE OF CORRECTION

PATENT NO. : 9,215,582 B2  
APPLICATION NO. : 13/505361  
DATED : December 15, 2015  
INVENTOR(S) : Olsson et al.

Page 1 of 1

It is certified that error appears in the above-identified patent and that said Letters Patent is hereby corrected as shown below:

On the Title Page, in Item (75), under "Inventors", in Column 1, Line 2, delete "Goran" and insert -- Göran --, therefor.

On the Title Page, in Item (75), under "Inventors", in Column 1, Line 2, delete "Linkoping" and insert -- Linköping --, therefor.

In Column 8, Line 48, delete "eNodeB 103" and insert -- eNodeB 105 --, therefor.

Signed and Sealed this
Fifth Day of April, 2016

Michelle K. Lee
*Director of the United States Patent and Trademark Office*